United States Patent
Ishikawa et al.

(10) Patent No.: US 12,248,774 B2
(45) Date of Patent: Mar. 11, 2025

(54) OTA MASTER, CENTER, SYSTEM, UPDATE METHOD, AND VEHICLE

(71) Applicant: TOYOTA JIDOSHA KABUSHIKI KAISHA, Toyota (JP)

(72) Inventors: Tomoyasu Ishikawa, Nagoya (JP); Shunsuke Tanimori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 17/667,731

(22) Filed: Feb. 9, 2022

(65) Prior Publication Data

US 2022/0276853 A1   Sep. 1, 2022

(30) Foreign Application Priority Data

Feb. 18, 2021   (JP) .................. 2021-024111

(51) Int. Cl.
*G06F 8/65*   (2018.01)
*G07C 5/00*   (2006.01)

(52) U.S. Cl.
CPC .............. *G06F 8/65* (2013.01); *G07C 5/008* (2013.01)

(58) Field of Classification Search
CPC .... G06F 8/60–66; G07C 5/008; G07C 5/0841
USPC .................................................. 717/168–178
See application file for complete search history.

(56) References Cited

U.S. PATENT DOCUMENTS

| 2014/0310698 A1 | 10/2014 | Lee et al. |
| 2020/0050378 A1* | 2/2020 | Sakurai ................. G06F 8/654 |
| 2021/0155177 A1 | 5/2021 | Harata et al. |
| 2021/0157566 A1 | 5/2021 | Sakurai et al. |

FOREIGN PATENT DOCUMENTS

| JP | 2004-326689 A | 11/2004 | |
| JP | 2020-027622 A | 2/2020 | |
| JP | 2020-027628 A | 2/2020 | |
| KR | 10-2014-0123143 A | 10/2014 | |
| WO | WO-2018139296 A1 * | 8/2018 | ............ B60R 16/02 |
| WO | 2019/133824 A1 | 7/2019 | |
| WO | WO-2020170407 A1 * | 8/2020 | ............ B41J 11/48 |

OTHER PUBLICATIONS

Over-the-air programming, Wikipedia, 2019, 4 pages, [retrieved on Sep. 6, 23], Retrieved from the Internet: <URL:https://web.archive.org/web/20190626211348/https://en.wikipedia.org/wiki/Over-the-air_programming>.*

* cited by examiner

*Primary Examiner* — Geoffrey R St Leger
(74) *Attorney, Agent, or Firm* — Oliff PLC

(57) ABSTRACT

An OTA master is configured to control software update for an electronic control unit mounted on a vehicle. The OTA master includes a communication unit configured to receive, front a center, a distribution package including update data for an electronic control unit on which a first-kind non-volatile memory having one storage area is mounted and update data for an electronic control unit on which a second-kind non-volatile memory having two storage areas is mounted.

18 Claims, 10 Drawing Sheets

| ECU ID | MEMORY TYPE |
|---|---|
| aaaa | SECOND TYPE (DUAL BANK) |
| bbbb | SECOND TYPE (DUAL BANK) |
| cccc | FIRST TYPE (SINGLE BANK) |
| dddd | FIRST TYPE (SINGLE BANK) |
| ... | ... |

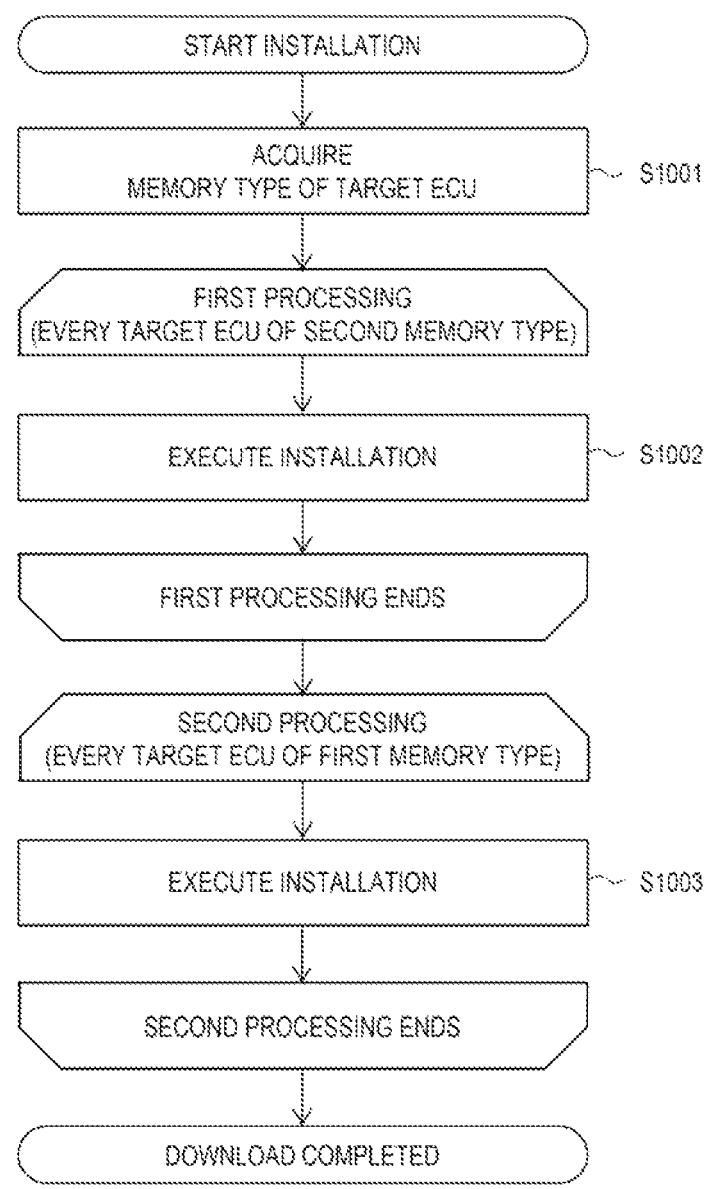

OTA MASTER, CENTER, SYSTEM, UPDATE METHOD, AND VEHICLE

CROSS-REFERENCE TO RELATED APPLICATION

This application claims priority to Japanese Patent Application No. 2021-024111 filed on Feb. 18, 2021, incorporated herein by reference in its entirety.

BACKGROUND

1. Technical Field

The present disclosure relates to an OTA master, a center, a system, an update method, a non-transitory storage medium, and a vehicle.

2. Description of Related Art

A plurality of electronic control units used for controlling an operation of a vehicle is mounted on a vehicle. The electronic control unit includes a processor, a non-transitory storage unit, such as a random access memory (RAM), and a non-volatile memory which is a non-volatile storage unit, such as a flash read-only memory (ROM). A control function of the electronic control unit is implemented when the processor executes software stored in the non-volatile memory. Software stored in each electronic control unit is rewritable, and by updating to a newer version of the software, it is possible to improve a function of each electronic control unit or add a new vehicle control function.

As a technology for updating software of an electronic control unit, an over-the-air (OTA) technology is well-known. In the OTA technology, a device that wirelessly connects an in-vehicle communication device connected to an in-vehicle network to a communication network, such as the Internet, and executes software update processing of the vehicle updates or adds the software of the electronic control unit by downloading software from a server via wireless communication and installing the downloaded software on the electronic control unit (see, for example, Japanese Unexamined Patent Application Publication No. 2004-326689.)

As types of non-volatile memories mounted on the electronic control unit, there are a memory (a single bank memory) that has one storage area used for storing data, such as software, and a memory (a dual bank memory) that has two storage areas used for storing data, such as software. The non-volatile memories may be properly used according to specifications or the like of the electronic control unit. An electronic control unit having the dual bank memory mounted thereon can store two versions of data, old and new, in the two storage areas, respectively.

SUMMARY

In a campaign, which is an event for updating software for vehicles, there is a case where both an electronic control unit having a single bank memory mounted thereon and an electronic control unit having a dual bank memory mounted thereon are electronic control units of which software is to be updated. Due to structures of the memories, the electronic control unit having the single bank memory mounted thereon and the electronic control unit having the dual bank memory mounted thereon have different recovery methods when the update fails.

There are cases where a campaign in which the electronic control unit having the single bank memory mounted thereon and the electronic control unit having the dual bank memory mounted thereon are mixed as the electronic control units to be updated is applied to a vehicle. In this case, it is desired to perform appropriate software download and installation according to the structures of the memories mounted on the electronic control unit to be updated.

The present disclosure provides an OTA master, a center, a system, an update method, a non-transitory storage medium, and a vehicle that can execute software update adapted to a single bank memory and a dual bank memory.

An OTA master according to a first aspect of the present disclosure is configured to control software update for an electronic control unit mounted on a vehicle. The OTA master includes a communication unit configured to receive, from a center, a distribution package including update data for the electronic control unit on which a first-kind non-volatile memory having one storage area is mounted and update data for the electronic control unit on which a second-kind non-volatile memory having two storage areas is mounted.

In the first aspect, the OTA master may further include a control unit configured to, based on kind information indicating whether the non-volatile memory mounted on the electronic control unit is the first kind or the second kind, transfer the update data received by the communication unit to the electronic control unit to be updated.

In the first aspect, the communication unit may acquire the kind information from the center.

In the first aspect, the OTA master may further include a storage unit configured to store the kind information.

In the first aspect, the control unit may transfer the update data to the electronic control unit to be updated with prioritizing, based on the kind information, the update data for the electronic control unit on which the second-kind non-volatile memory is mounted over the update data for the electronic control unit on which the first-kind non-volatile memory is mounted.

A center according to a second aspect of the present disclosure is configured to communicate with an OTA master that controls software update for an electronic control unit mounted on a vehicle. The center includes a communication unit configured to transmit, to the OTA master, a distribution package including update data for the electronic control unit on which a first-kind non-volatile memory having one storage area is mounted and the electronic control unit on which a second-kind non-volatile memory having two storage areas is mounted.

In the second aspect, the center may further include a storage unit configured to store kind information indicating whether the non-volatile memory mounted on the electronic control unit is the first kind or the second kind.

In the second aspect, the communication unit may transmit the kind information stored in the storage unit to the OTA master.

A system according to a third aspect of the present disclosure includes an OTA master configured to control software update for an electronic control unit mounted on a vehicle and a center configured to communicate with the OTA master. The center includes a communication unit configured to transmit, to the OTA master, a distribution package including update data for the electronic control unit on which a first-kind non-volatile memory having one storage area is mounted and update data for the electronic control unit on which a second-kind non-volatile memory having two storage areas is mounted. The OTA master includes a communication unit configured to receive the distribution package transmitted by the center.

In the third aspect, the OTA master may include a control unit configured to transfer the update data to the electronic control unit to be updated with prioritizing, based on kind information indicating whether the non-volatile memory mounted on the electronic control unit is the first kind or the second kind, the update data for the electronic control unit mounted on the second-kind non-volatile memory over the update data for the electronic control unit mounted on the first-kind non-volatile memory. The update data for the electronic control unit mounted on the second-kind non-volatile memory and the update data for the electronic control unit mounted on the first-kind non-volatile memory are included in the distribution package.

In the third aspect, at least one of the center and the OTA master may include a storage unit configured to store the kind information.

A fourth aspect of the present disclosure is an update method executed by an OTA master. The OTA master includes a processor and a memory, and is configured to control software update for an electronic control unit mounted on a vehicle. The update method includes a step of receiving, by the OTA master, from a center, a distribution package including update data for the electronic control unit on which a first-kind non-volatile memory having one storage area is mounted and update data for the electronic control unit on which a second-kind non-volatile memory having two storage areas is mounted, and a step of transferring, by the OTA master, the update data to the electronic control unit to be updated with prioritizing, based on kind information indicating whether the non-volatile memory mounted on the electronic control unit is the first kind or the second kind, the update data for the electronic control unit on which the second-kind non-volatile memory is mounted over the update data for the electronic control unit on which the first-kind non-volatile memory is mounted.

A non-transitory storage medium according to a fifth aspect of the present disclosure stores a command executable by a processor of an OTA master. The OTA master includes the processor and a memory and controls software update for an electronic control unit mounted on a vehicle. The command causes the processor to execute functions including receiving, by the OTA master, from a center, a distribution package including update data for the electronic control unit on which a first-kind non-volatile memory having one storage area is mounted and update data for the electronic control unit on which a second-kind non-volatile memory having two storage areas is mounted, and transferring, by the OTA master, the update data to the electronic control unit to be updated with prioritizing, based on kind information indicating whether the non-volatile memory mounted on the electronic control unit is the first kind or the second kind, the update data for the electronic control unit on which the second-kind non-volatile memory is mounted over the update data for the electronic control unit on which the first-kind non-volatile memory is mounted.

A vehicle according to a sixth aspect of the present disclosure includes an OTA master configured to control software update for an electronic control unit mounted on a vehicle. The OTA master includes a communication unit configured to receive, from a center, a distribution package including update data for the electronic control unit on which a first-kind non-volatile memory having one storage area is mounted and update data for the electronic control unit on which a second-kind non-volatile memory having two storage areas is mounted.

With each aspect of the present disclosure, it is possible to provide an OTA master, a center, a system, an update method, a non-transitory storage medium, and a vehicle that can execute software update adapted to a single bank memory and a dual bank memory.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 10 is a flowchart of installation processing procedures according to a third specific example executed by the OTA master and a target electronic control unit;

DETAILED DESCRIPTION OF EMBODIMENTS

In a network system used for updating a program of an electronic control unit (ECU) of the present disclosure, a center and an OTA master transmit and receive with each other a distribution package in which update data for an ECU having a single bank memory mounted thereon and update data for an ECU having a dual bank memory mounted thereon are mixed. As such, for example, when generating a distribution package, the center can check consistency between a memory type of a target ECU and update data, and prioritize installation on a target ECU having the dual bank memory mounted thereon over installation on a target ECU having the single bank memory mounted thereon. Hereinafter, embodiments of the present disclosure will be described in detail with reference to the drawings.

EMBODIMENTS

Configuration

Figure 1:
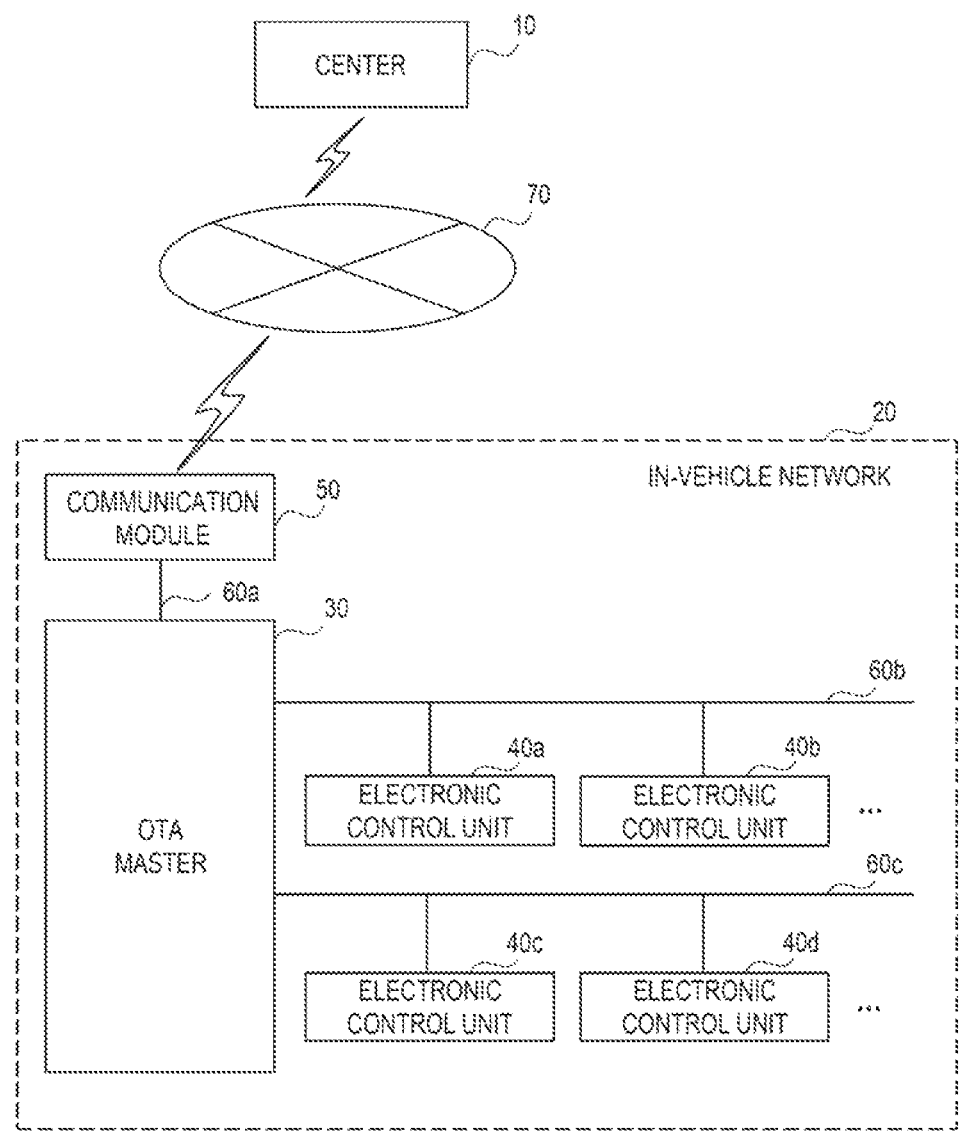
FIG. 1 is a block diagram illustrating an overall configuration of a network system according to an embodiment.

FIG. 1 is a block diagram illustrating an overall configuration of a network system according to an embodiment of the present disclosure. The network system illustrated in FIG. 1 is used for updating software of a plurality of ECUs 40a to 40d mounted on a vehicle, and includes a center 10 outside the vehicle and an in-vehicle network 20 constructed inside the vehicle.

(1) Center

The center 10 can communicate with an OTA master 30 included in the in-vehicle network 20 via a network 70, and can manage software update for the ECUs 40a to 40d connected to the OTA master 30. The OTA master 30 will be described below. The center 10 functions as a so-called server.

Figure 2:
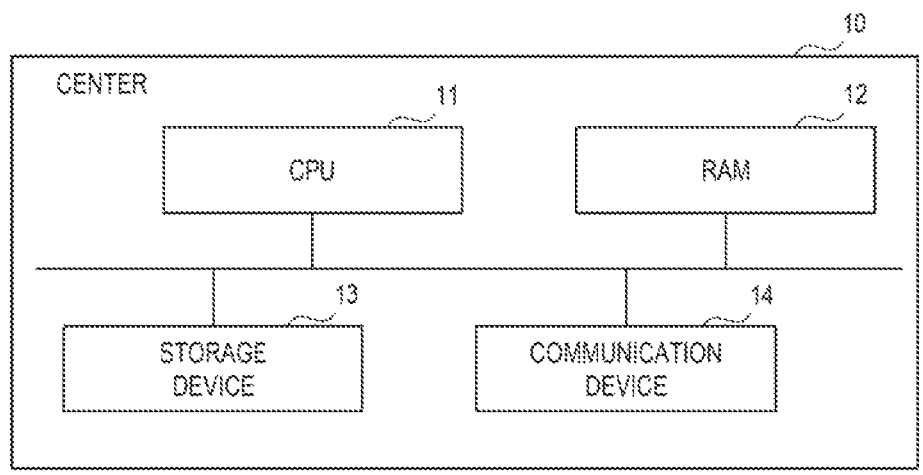
FIG. 2 is a block diagram illustrating a schematic configuration of a center.

FIG. 2 is a block diagram illustrating a schematic configuration of the center 10 in FIG. 1. As illustrated in FIG. 2, the center 10 includes a central processing unit (CPU) 11, a RAM 12, a storage device 13, and a communication device 14. The storage device 13 includes a readable and writable storage medium, such as a hard disk drive (HDD) or a solid state drive (SSD), and stores a program used for executing software update management, information used for the software update management, update data for each ECU, and the like. At the center 10, the CPU 11 executes predetermined processing for the software update by executing a program read from the storage device 13 using the RAM 12 as a work area. The communication device 14 is used for communicating with the OTA master 30 via the network 70.

(2) In-Vehicle Network

The in-vehicle network 20 includes the OTA master 30, the ECUs 40a to 40d, and a communication module 50. The OTA master 30 is connected to the communication module 50 via a bus 60a, connected to the ECUs 40a, 40b via a bus 60b, and connected to the ECUs 40c, 40d via a bus 60c.

The OTA master 30 can wirelessly communicate with the center 10 via the communication module 50. The OTA master 30 has functions of managing an OTA state and executing the software update for an ECU of which software is to be updated (hereinafter also referred to as a "target ECU") by controlling a software update sequence, and, based on the update data acquired from the center 10, controls the software update for the target ECU from among the ECTs 40a to 40d. The OTA master 30 may also be referred to as a central gateway (CGW).

The ECUs 40a to 40d are devices used for controlling an operation of each part of the vehicle. In FIG. 1, four ECUs 40a to 40d are illustrated, but the number of ECUs is not particularly limited. For example, the OTA master 30 may be connected to a display device (an HMI) used for executing various displays, such as a display representing that there is update data at the time of executing the software update processing of the ECUs 40a to 40d, a display of an approval request screen for requesting approval for the software update from a user or a manager of the vehicle, and a display of a result of the software update. As the display device, for example, a car navigation system can be used. Further, the number of buses that connect the ECUs to the OTA master 30 is not particularly limited, either. For example, the above-described display device may be connected to the OTA master 30 via a bus other than the buses 60a to 60c.

The communication module 50 is a unit having a function of controlling communication between the center 10 and the vehicle, and is a communication device that connects the in-vehicle network 20 to the center 10. The communication module 50 may be included in the OTA master 30.

Figure 3:
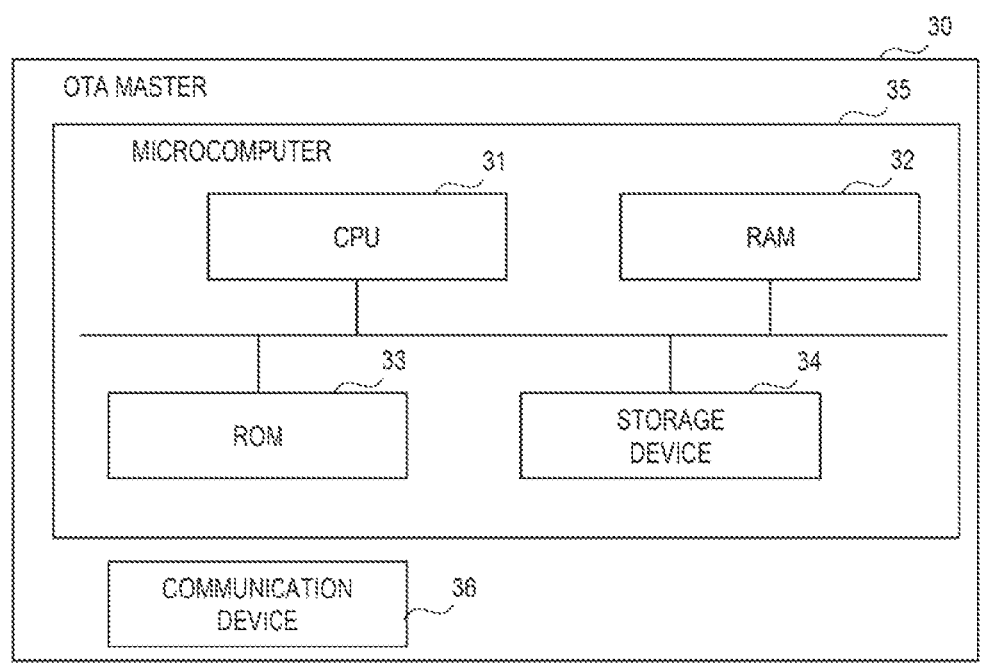
FIG. 3 is a block diagram illustrating a schematic configuration of an OTA master.

FIG. 3 is a block diagram illustrating a schematic configuration of the OTA master 30 in FIG. 1. As illustrated in FIG. 3, the OTA master 30 includes a CPU 31, a RAM 32, a ROM 33, a storage device 34, and a communication device 36. The CPU 31, the RAM 32, the ROM 33, and the storage device 34 compose a microcomputer 35. In the OTA master 30, the CPU 31 executes predetermined processing for the software update by executing a program read from the ROM 33 using the RAM 32 as a work area. The communication device 36 is used for communicating with the communication module 50 and the ECUs 40a to 40d via the buses 60a to 60c illustrated in FIG. 1.

Figure 4A:
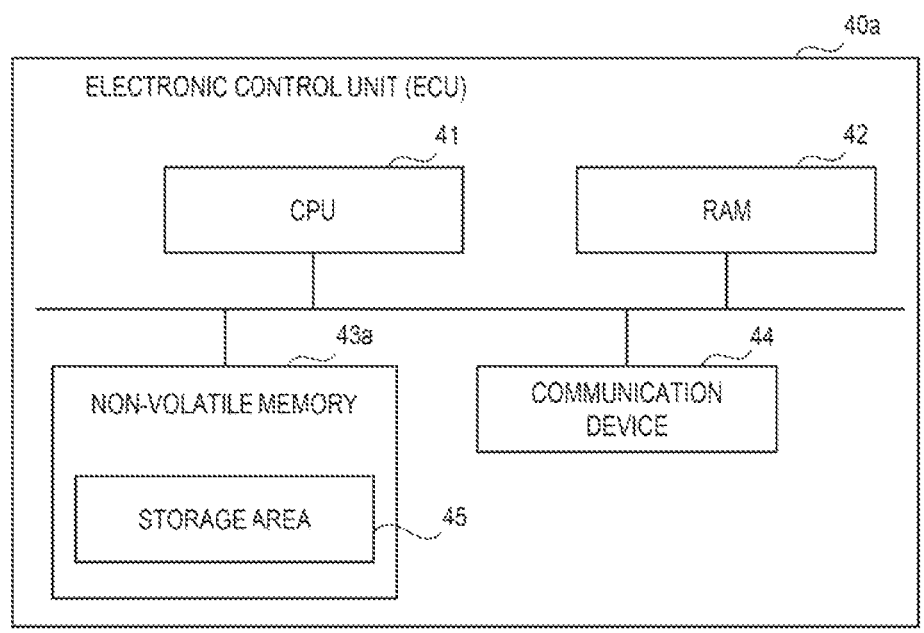
FIG. 4A is a block diagram illustrating an example of a schematic configuration of an electronic control unit.
Figure 4B:
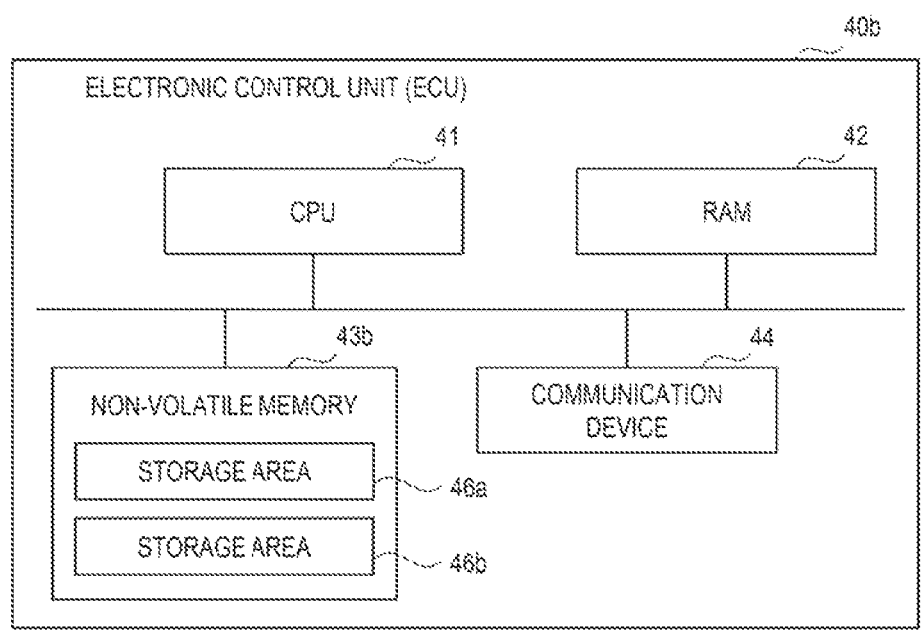
FIG. 4B is a block diagram illustrating another example of the schematic configuration of the electronic control unit.

Each of FIGS. 4A and 4B is a block diagram illustrating an example of a schematic configuration of an ECU.

The ECU 40a illustrated in FIG. 4A includes a CPU 41, a RAM 42, a non-volatile memory 43a, and a communication device 44. The CPU 41 implements a function of the ECU 40a by executing the program read from the non-volatile memory 43a using the RAM 42 as a work area. The non-volatile memory 43a is a memory (a single bank memory) having one storage area 45 used for storing software. Hereinafter, a type of the non-volatile memory 43a configured to have the one storage area 45 is referred to as a "first type". In the storage area 45, in addition to the software used for implementing the function of the ECU 40a, version information, parameter data, a boot program for booting, a program for updating software, or the like may be stored. The communication device 44 is used for communicating with the OTA master 30 or other ECUs 40b to 40d connected to the in-vehicle network 20.

Similar to the ECU 40a, the ECU 40b illustrated in FIG. 4B includes the CPU 41, the RAM 42, a non-volatile memory 43b, and the communication device 44. However, the non-volatile memory 43b mounted on the ECU 40b is a memory (a dual bank memory) having two storage areas 46a, 46b used for storing programs. Hereinafter, a type of the non-volatile memory 43b configured to have the two storage areas 46a, 46b is referred to as a "second type". In the storage areas 46a, 46b, in addition to the software used for implementing the function of the ECU 40b, version information, parameter data, a boot program for booting, a program for updating software, or the like, may be stored. The CPU 41 of the ECU 40b uses any one of the two storage areas 46a, 46b included in the non-volatile memory 43b as the storage area (an operational side) to be read, and executes software stored in the storage area to be read. On the other storage area (a non-operational side) that is not to be read, the update software (an updated version program) can be installed (written) based on the update data on the background while the program in the storage area (the operational side) to be read is being executed. In the software update processing, at the time of executing activation (making the update software effective), the update software can be activated by switching the storage area from which the program is read by the CPU 41 of the ECU 40b.

As a specific example, it is assumed that the current software is stored in the storage area 46a and the update software is installed in the storage area 46b. Upon receiving an instruction on activating the update software from the OTA master 30, the CPU 41 of the ECU 40b can switch the storage area (the operational side) to be read of the CPU 41 by switching, for example, a read start address of the CPU 41 of the ECU 40b from a head address of the storage area 46a to a head address of the storage area 46b, and can execute the update software installed in the storage area 46b.

In the present disclosure, a configuration referred to as a "one-sided suspension memory" in which one storage area is pseudo-divided into two sides and a program can be written on the one side while the program stored on the other side is being executed is also classified into the second type memory.

Figure 5:
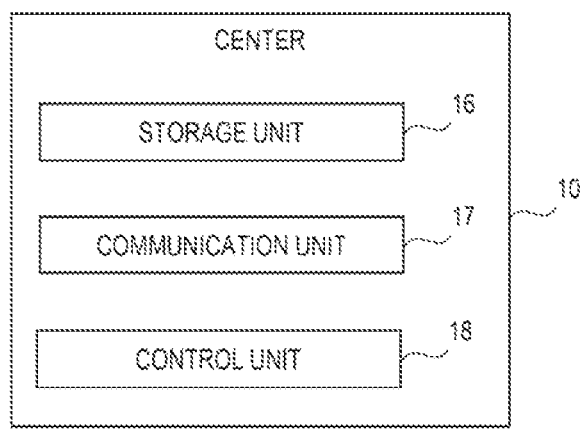
FIG. 5 is a functional block diagram of the center.

FIG. 5 is a functional block diagram of the center 10 illustrated in FIG. 2. The center 10 illustrated in FIG. 5 includes a storage unit 16, a communication unit 17, and a control unit 18. The function of the storage unit 16 is implemented by the storage device 13 illustrated in FIG. 2. The functions of the communication unit 17 and the control unit 18 are implemented when the CPU 11 illustrated in FIG. 2 executes a program stored in the storage device 13 using the RAM 12.

The storage unit 16 stores information on the software update processing of one or more ECUs mounted on the vehicle. As the information on the software update processing, the storage unit 16 stores update management information associated with information indicating software usable in the ECU for each vehicle identification information (a vehicle ID) for identifying the vehicle, and the update data of the software of the ECU. As the information indicating the software usable in the ECU, for example, a combination of the latest version information of each piece of software of a plurality of ECUs is defined.

The communication unit 17 can receive a software update confirmation request from the OTA master 30. The update confirmation request is information which is transmitted from the OTA master 30 to the center 10 and is for requesting the center 10 to confirm whether there is update data for the ECU when, for example, a power supply or an ignition (LGN) is turned on in the vehicle. Further, the communication unit 17 can receive, from the OTA master 30, a request (a download request) for transmitting the distribution package. Upon receiving the download request for the distribution package, the communication unit 17 transmits, to the OTA master 30, the distribution package including the update data of the software of the ECU generated by the control unit 18 described below.

When the communication unit 17 receives the update confirmation request from the OTA master 30, the control unit 18 determines, based on the update management information stored in the storage unit 16, whether there is the update data of the software of the ECU mounted on the vehicle specified by the vehicle ID that is included in the update confirmation request. In the case where the control unit 18 determines that there is the update data of the software of the ECU, when the control unit 18 receives the download request for the distribution package from the OTA master 30, the control unit 18 generates the distribution package including the update data stored in the storage unit 16.

The control unit 18 may individually generate a distribution package including only the update data for the ECU having the first-type non-volatile memory (the single bank memory) mounted thereon and a distribution package including only the update data for the ECU having the second-type non-volatile memory (the dual bank memory) mounted thereon. Alternatively, the control unit 18 may generate the distribution package including the update data for the ECU having the first-type non-volatile memory (the single bank memory) mounted thereon and the update data for the ECU having the second-type non-volatile memory (the dual bank memory) mounted thereon. When the type information described below is stored in the storage unit 16 in advance, the control unit 18 can intentionally generate the distribution package in which a plurality of different types of pieces of update data is mixed. By generating such a distribution package in which the plurality of different types of pieces of update data is mixed, (the communication unit 17 of) the center 10 can transmit, to the OTA master 30, the distribution package including the update data for the ECU having the first-type non-volatile memory mounted thereon and the update data for the ECU having the second-type non-volatile memory mounted thereon.

Figure 6:
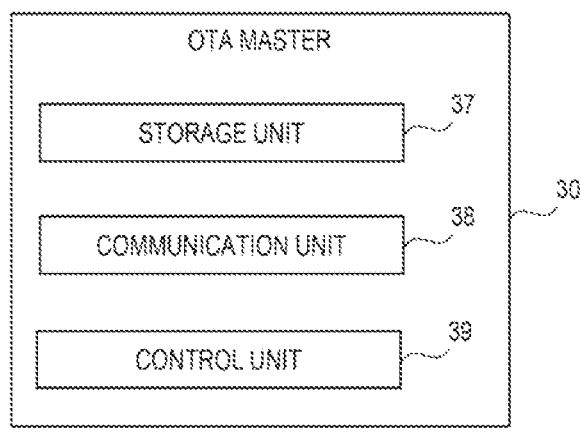
FIG. 6 is a functional block diagram of the OTA master.

FIG. 6 is a functional block diagram of the OTA master 30 illustrated in FIG. 2. The OTA master 30 illustrated in FIG. 6 includes a storage unit 37, a communication unit 38, and a control unit 39. The function of the storage unit 37 is implemented by the storage device 34 illustrated in FIG. 3. The functions of the communication unit 38 and the control unit 39 are implemented when the CPU 31 illustrated in FIG. 3 executes a program stored in the ROM 33 using the RAM 32.

Figures 7, 8:
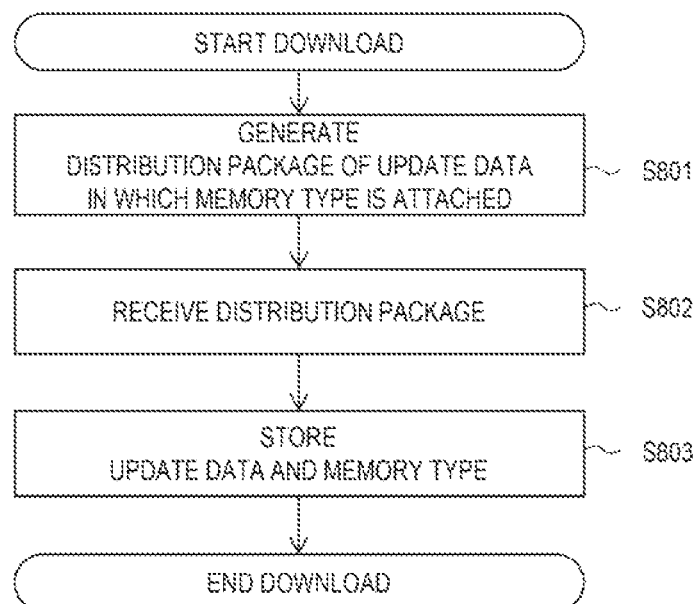
FIG. 7 is a diagram illustrating an example of type information.
FIG. 8 is a flowchart of download processing procedures according to a first specific example executed by the center and the OTA master.

The storage unit 37 stores information (hereinafter referred to as "type information") on the type of the non-volatile memory mounted on each of the ECUs 40*a* to 40*d*. FIG. 7 illustrates an example of the type information. In the type information illustrated in FIG. 7, an ECU_ID, which is a number used for identifying the ECU, is associated with the type (the first type or the second type) of the non-volatile memory mounted on the ECU.

The type information may be created in advance based on a specification of the ECU composing the in-vehicle network 20 and stored in the storage unit 37 at the time of manufacturing the vehicle. Alternatively, the type information may be acquired by the communication unit 38 described below from the target ECU by communication inside the in-vehicle network 20 at the time of executing the software update processing. When the type of non-volatile memory is acquired from the target ECU each time the software update processing is executed, the OTA master 30 can unitarily manage the types of non-volatile memories mounted on the ECUs mounted on the vehicle and appropriately respond even when the type of non-volatile memory is changed due to replacement of the ECU, or the like. Alternatively, the type information may be acquired from the center 10 by communication via the network 70. In this case, the types of the non-volatile memories of the ECUs mounted on the vehicle are managed in advance by the center 10.

When, for example, the power supply or the IGN of the vehicle is turned on, the communication unit 38 transmits the software update confirmation request to the center 10. The update confirmation request includes a vehicle ID used for identifying the vehicle and software versions of the ECUs 40*a* to 40*d* connected to the in-vehicle network 20. The vehicle ID and the software versions of the ECUs 40*a* to 40*d* are used for determining whether there is the update data of the software of the ECU by comparing them with the latest software version held by the center 10 for each vehicle ID. Further, as a response to the update confirmation request, the communication unit 38 receives, from the center 10, a notification indicating whether there is the update data. When there is the update data of the software of the ECU, the communication unit 38 transmits the download request for the distribution package to the center 10 and receives the distribution package transmitted from the center 10. In addition to the update data, the distribution package may include verification data for verifying the authenticity of the update data, the number of pieces of update data, installation order, type information, various pieces of control information which are used at the time of the software update, or the like. Further, when the type information is acquired from the target ECU at the time of executing the software update processing, the communication unit 38 acquires the type information by communicating with the target ECU.

The control unit 39 determines whether there is the update data of the software of the ECU based on the response from the center 10 to the update confirmation request received by the communication unit 38. Further, the control unit 39 verifies the authenticity of the distribution package received from the center 10 by the communication unit 38 and stored in the storage unit 37. Further, the control unit 39 transfers one or more pieces of update data downloaded in the distribution package to the target ECU and causes the target ECU to install the update software based on the update data. After the completion of the installation, the control unit 39 gives the target ECU an instruction on making the installed update software effective.

Here, when the non-volatile memory of the ECU is the first type (the single bank memory), approval request processing for requesting approval from a user or a manager of the vehicle for the software update is executed before the execution of the installation because the installation and the activation are consecutively executed. When the non-volatile memory of the ECU is the second type (the dual bank memory), the approval request processing for the software update is executed at least after the execution of the installation and before the execution of the activation. When the non-volatile memory of the ECU is the second type, the approval request processing for the software update may be executed before the execution of the installation or omitted.

In the approval request processing, the control unit 39 causes an output device to output a notification indicating that the approval for the software update is required or a notification prompting an input indicating that the software update has been approved. As the output device, a display device that outputs a notification by a display, a voice output device that outputs a notification by voice, or the like, can be used. For example, in the approval request processing, when the display device is used as the output device, the control unit 39 can cause the display device to display an approval request screen used for requesting the approval for the software update, and cause the display unit to display a notification prompting a specific input operation, such as pressing of an approval button in the case where the user or the manager approves the request. Alternatively, in the approval request processing, the control unit 39 can cause the display device to display text, an icon, or the like, notifying that there is the update data of the software of the ECU, or cause the display device to display restrictions and the like during the execution of the software update processing.

The control unit 39 executes the approval request processing at a timing according to the memory type of the target ECU based on the type information. Then, upon receiving the input indicating that the request has been approved from the user or the manager, the control unit 39 executes control processing of the above-described installation and activation, and updates the software of the target ECU.

The software update processing is composed of a phase in which the OTA master 30 downloads the update data from the center 10 (a download phase), a phase in which the OTA master 30 transfers the downloaded update data to the target ECU and installs the update software based on the update data in the storage area of the target ECU (an installation phase), and a phase in which the target ECU makes the installed update software effective (an activation phase).

The download is processing in which the OTA master 30 receives, from the center 10, the update data for updating the software of the ECU transmitted in the distribution package and stores it in the storage unit 37. Regarding reception of the update data by downloading, the update data for the ECU having the second-type non-volatile memory (the dual bank memory) mounted thereon, which has a relatively low probability of update failure, may be received with prioritizing it, or the update data for the ECU having the first-type non-volatile memory (the single bank memory) mounted thereon and the update data for the ECU having the second-type non-volatile memory (the dual bank memory) mounted thereon may be received without prioritizing any of them. The download phase includes not only the execution of the download, but also controls of a series of processes associated with the download, such as determining whether the download can be executed and verifying the update data.

The update data transmitted from the center 10 to the OTA master 30 may include any of the update software of the ECU, the compressed data obtained by compressing the update software, and the divided data obtained by dividing the update software or the compressed data. Further, the update data may include a number of the target ECU (ECU_ID) and a number used for identifying the software of the ECU before the update (ECU_Software_ID). The update data is downloaded as the above-described distribution package, but the distribution package includes the update data for a single ECU or a plurality of ECUs.

The installation is processing in which the OTA master 30 writes the update software (the updated version program) on the target ECU, based on the update data downloaded from the center 10. The installation phase includes not only the execution of the installation, but also controls of a series of processes associated with the installation, such as determining whether the installation can be executed, transferring the update data, and verifying the update software.

When the update data includes the update software itself, in the installation phase, the OTA master 30 transfers the update data (the update software) to the target ECU. Further, when the update data includes the compressed data of the update software, difference data, or divided data, the OTA master 30 may transfer the update data to the target ECU and the target ECU may generate the update software from the update data, or the OTA master 30 may generate the update software from the update data and then transfer the update software to the target ECU. Here, the update software can be generated by decompressing the compressed data and assembling (integrating) the difference data or the divided data.

The update software can be installed by the target ECU based on a request for the installation from the OTA master 30. Alternatively, the target ECU that has received the update data may autonomously execute the installation without receiving an explicit instruction from the OTA master 30.

The activation is processing in which the target ECU makes (activates) the installed update software effective. The activation phase includes not only the execution of the activation but also controls of a series of processes associated with the activation, such as determining whether the activation can be executed and verifying the execution result.

The update software can be activated by the target ECU based on a request for the activation from the OTA master 30. Alternatively, the target ECU that has received the update data may autonomously activate after the completion of the installation without receiving an explicit instruction from the OTA master 30.

The software update processing can be executed continuously or in parallel to each of the ECUs.

Further, the "software update processing" in the present specification includes not only processing for continuously executing all of the download, installation, and activation, but also processing for executing only a part of the download, installation, and activation.

Processing

Next, specific examples of the software update processing executed in the network system according to the present embodiment will be described with further reference to FIGS. 8, 9, 10, 11A, 11B, and 12.

(1) First Specific Example

FIG. 8 is a flowchart describing download processing procedures according to a first specific example executed by the center 10 and the OTA master 30. The first specific example is an example where the center 10 manages the type of the non-volatile memory mounted on each of the ECUs 40a to 40d, that is, the storage unit 16 stores the type information. The storage unit 37 of the OTA master 30 may also store the same type information. The processing illustrated in FIG. 8 is started when the center 10 receives the download request for the distribution package from the OTA master 30.

(Step S801) The center 10 generates the distribution package including the update data for the target ECU of which the software is to be updated. At this time, the center 10 refers to the type information stored in the storage unit 16 and generates the distribution package in which the type of the non-volatile memory mounted on the target ECU is attached to the update data as an attribute. When the distribution package is generated, the process proceeds to step S802.

(Step S802) The OTA master 30 receives the distribution package transmitted from the center 10. When the distribution package is received, the process proceeds to step S803.

(Step S803) The OTA master 30 stores, in the storage unit 37, the update data and the memory type attached to the update data as the attribute that are included in the distribution package received from the center 10. As such, the download processing ends.

As in the first specific example, when the center 10 manages the type information, at the time of generating the distribution package, consistency between the update data and the target ECU for the memory type can be checked. For this reason, it is possible to avoid a situation where consistency is not found in the OTA master 30 after the download. Therefore, it is possible to prevent an occurrence of retransmitting the distribution package and restrict an increase in an amount of communication (a communication load) between the center 10 and the OTA master 30.

(2) Second Specific Example

Figure 9:
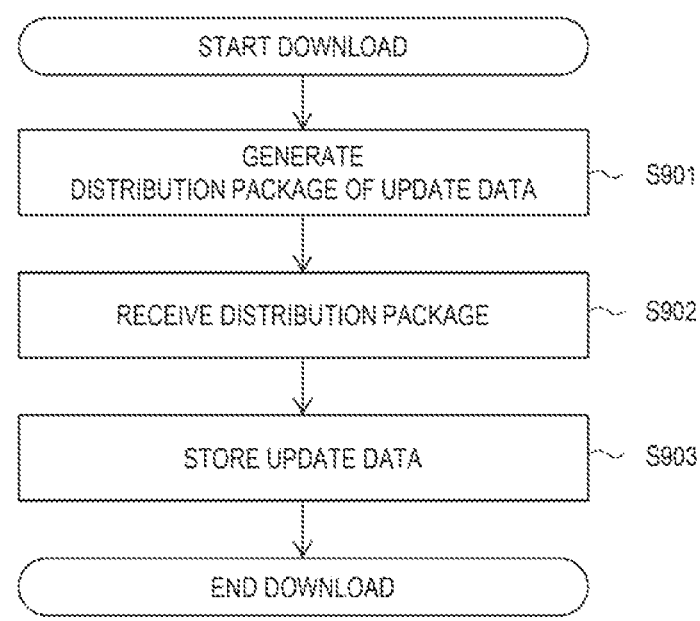
FIG. 9 is a flowchart of download processing procedures according to a second specific example executed by the center and the OTA master.

FIG. 9 is a flowchart describing download processing procedures according to a second specific example executed by the center 10 and the OTA master 30. The second specific example is an example where the OTA master 30 manages the type of the non-volatile memory mounted on each of the ECUs 40a to 40d, that is, the storage unit 16 of the center 10 does not store the type information. The processing illustrated in FIG. 9 is started when the center 10 receives the download request for the distribution package from the OTA master 30.

(Step S901) The center 10 generates the distribution package including the update data for the target ECU of which the software is to be updated. At this time, the center 10 does not have to grasp whether the update data for the ECU having the first-type non-volatile memory (the single bank memory) mounted thereon and the update data for the ECU having the second-type non-volatile memory (the dual bank memory) mounted thereon are included in the distribution package. When the distribution package is generated, the process proceeds to step S902.

(Step S902) The OTA master 30 receives the distribution package transmitted from the center 10. When the distribution package is received, the process proceeds to step S903.

(Step S903) The OTA master 30 stores, in the storage unit 37, the update data included in the distribution package received from the center 10. As such, the download processing ends.

In the second specific example, since the OTA master 30 manages the type information, when the type of the non-volatile memory is changed due to replacement of the ECU or the like, the type information managed by the OTA master 30 can be swiftly updated inside the vehicle (the in-vehicle network 20).

(3) Third Specific Example

FIG. 10 is a flowchart describing installation processing procedures according to a third specific example executed by the OTA master 30 and the target ECU. The third specific example is an example where the OTA master 30 controls the installation order of the update data according to the type of the non-volatile memory mounted on the target ECU. In this case, the type of the non-volatile memory mounted on each of the ECUs 40a to 40d may be managed by any one of the center 10 and the OTA master 30. The processing illustrated in FIG. 10 is started after the download of the update data is completed and when a predetermined condition (the installation can be executed, the update software is verified, and the like) is satisfied.

(Step S1001) The OTA master 30 acquires the type (the first type/the second type) of the non-volatile memory mounted on the target ECU. The memory type can be acquired by referring to the type information stored in the storage unit 37 when the OTA master 30 manages the memory type, and by referring to the information of the memory type that is included in the distribution package and transmitted when the center manages the memory type. When the memory type of the target ECU is acquired, the process proceeds to step S1002.

(Step S1002) The OTA master 30 and the target ECU having the second-type non-volatile memory (the dual bank memory) mounted thereon execute the installation, which is the processing for writing the update software on the storage area based on the update data. The installation is executed continuously or in parallel on every target ECU having the second-type non-volatile memory mounted thereon (first processing). When the execution of the installation on every target ECU having the second-type non-volatile memory mounted thereon ends, the process proceeds to step S1003.

(Step S1003) The OTA master 30 and the target ECU having the first-type non-volatile memory (the single bank memory) mounted thereon execute the installation, which is the processing for writing the update software on the storage area based on the update data. The installation is executed continuously or in parallel on every target ECU having the first-type non-volatile memory mounted thereon (second processing). When the execution of the installation on every target ECU having the first-type non-volatile memory mounted thereon ends, the installation on every target ECU is completed and the installation processing ends.

In the third specific example, the installation is executed with prioritizing the target ECU having the dual bank memory that does not require a stop control during the update mounted thereon over the target ECU having the single bank memory that requires the stop control during the update mounted thereon. By this processing, the OTA master 30 that can grasp the writing status of the update software in real time can write the update software on the storage area of the target ECU having the dual bank memory mounted thereon first, and at the timing at which the writing is almost completed, start writing the update software on the storage area of the target ECU having the single bank memory mounted thereon. As such, it is possible to reduce the communication load inside the vehicle (the in-vehicle network 20) and shorten a time during which the control of the vehicle should be stopped until the writing of all the update software is completed.

(4) Fourth Specific Example

Figure 11A:
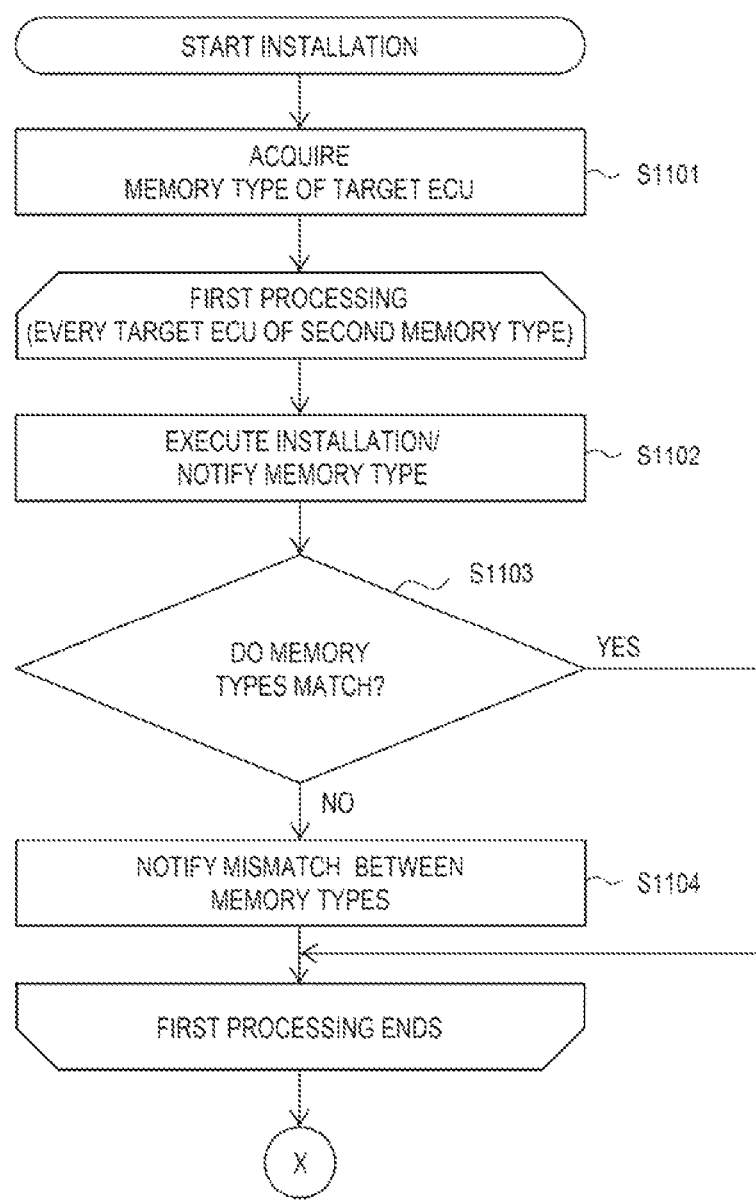
FIG. 11A is a flowchart of installation processing procedures according to a fourth specific example executed by the OTA master and the target electronic control unit.
Figure 11B:
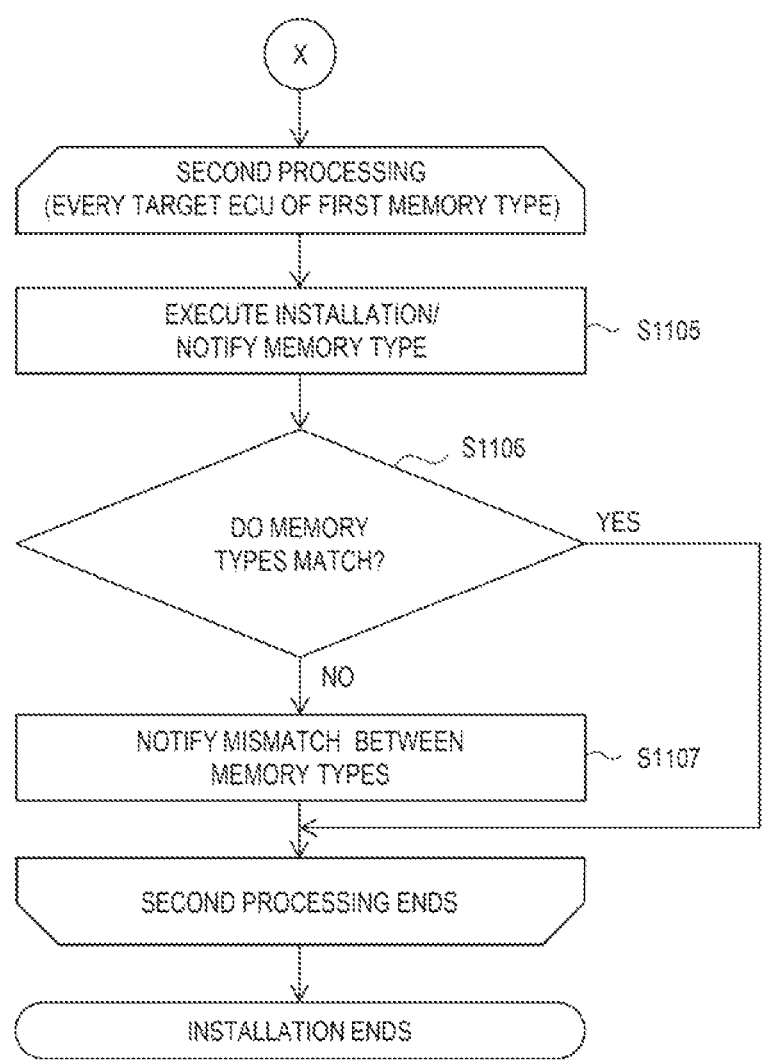
FIG. 11B is another flowchart of the installation processing procedures according to the fourth specific example executed by the OTA master and the target electronic control unit.

FIGS. 11A and 11B are flowcharts illustrating installation processing procedures according to a fourth specific example executed by the OTA master 30 and the target ECU. The processing of FIG. 11A and the processing of FIG. 11B are linked by a binder X. The fourth specific example is an example where the OTA master 30 controls the installation order of the update data according to the type of the non-volatile memory mounted on the target ECU while trying to make the type of the non-volatile memory mounted on the target ECU consistent with the memory type managed in the type information. In this case, the type of the non-volatile memory mounted on each of the ECUs 40a to 40d may be managed by any one of the center 10 and the OTA master 30. The processing illustrated in FIGS. 11A and 11B is started after the download of the update data is completed and when a predetermined condition (the installation can be executed, the update software is verified, and the like) is satisfied.

(Step S1101) The OTA master 30 acquires the type (the first type/the second type) of the non-volatile memory mounted on the target ECU. The memory type can be acquired by referring to the type information stored in the storage unit 37 when the OTA master 30 manages the memory type, and by referring to the information of the memory type that is included in the distribution package and transmitted when the center manages the memory type. When the memory type of the target ECU is acquired, the process proceeds to step S1102.

(Step S1102) The OTA master 30 and the target ECU having the second-type non-volatile memory (the dual bank memory) mounted thereon execute the installation, which is the processing for writing the update software on the storage area based on the update data. At this time, the OTA master 30 notifies the memory type acquired in step S1101 to the target ECU that has executed the installation. When the installation and the notification of the memory type are executed to the target ECU having the second-type non-volatile memory mounted thereon, the process proceeds to step S1103.

(Step S1103) The target ECU that has executed the installation determines whether the type of the non-volatile memory mounted on the target ECU itself matches the memory type notified from the OTA master 30. In other words, the target ECU that has executed the installation determines whether the memory type notified from the OTA master 30 is the second type. When both the memory types match each other (step S1103: YES), the first processing ends, and when both the memory types do not match each other (step S1103: NO), the process proceeds to step S1104.

(Step S1104) The target ECU having the second-type non-volatile memory mounted thereon notifies the OTA master 30 that the memory type notified from the OTA master 30 does not match the type of the non-volatile memory mounted on the target ECU itself. When the center 10 manages the type of the non-volatile memory mounted on each of the ECUs 40a to 40d, the notification is output from the OTA master 30 to the center 10. When the mismatch between the memory types is notified, the first processing ends.

The first processing according to the above-described steps S1102 to S1104 is executed continuously or in parallel to every target ECU having the second-type non-volatile memory (the dual bank memory) mounted thereon.

(Step S1105) The OTA master 30 and the target ECU having the first-type non-volatile memory (the single bank memory) mounted thereon execute the installation, which is processing for writing the update software on the storage area based on the update data. At this time, the OTA master 30 notifies the memory type acquired in step S1101 to the target ECU that has executed the installation. When the installation and the notification of the memory type are executed to the target ECU having the first-type non-volatile memory mounted thereon, the process proceeds to step S1106.

(Step S1106) The target ECU that has executed the installation determines whether the type of the non-volatile memory mounted on the target ECU itself matches the memory type notified from the OTA master 30. In other words, the target ECU that has executed the installation determines whether the memory type notified from the OTA master 30 is the first type. When both the memory types match each other (step S1106: YES), the second processing ends, and when both the memory types do not match each other (step S1106: NO), the process proceeds to step S1107.

(Step S1107) The target ECU having the first-type non-volatile memory mounted thereon notifies the OTA master 30 that the memory type notified from the OTA master 30 does not match the type of the non-volatile memory mounted on the target ECU itself. When the center 10 manages the type of the non-volatile memory mounted on each of the ECUs 40a to 40d, the notification is output from the OTA master 30 to the center 10. When the mismatch between the memory types is notified, the second processing ends.

The second processing according to the above-described steps S1105 to S1107 is executed continuously or in parallel to every target ECU having the first-type non-volatile memory (the single bank memory) mounted thereon.

When the execution of the installation on every target ECU having the second-type non-volatile memory (the first processing) is completed and the execution of the installation on every target ECU having the first-type non-volatile memory (the second processing) is completed, the installation processing ends.

In the fourth specific example, in addition to the execution of the installation with prioritizing the target ECU having the dual bank memory that does not require the stop control during the update mounted thereon over the target ECU having the single bank memory that requires the stop control during the update mounted thereon (the third specific example), consistency between the type of the non-volatile memory mounted on the target ECU and the memory type managed in the type information is checked. By this processing, when the memory type in the type information managed by the center 10 or the OTA master 30 deviates from an actual state of the target ECU, update software suitable for the actual state can be installed again. Further, as necessary, the memory type in the type information managed by the center 10 or the OTA master 30 can be rewritten and updated.

(5) Fifth Specific Example

Figure 12:
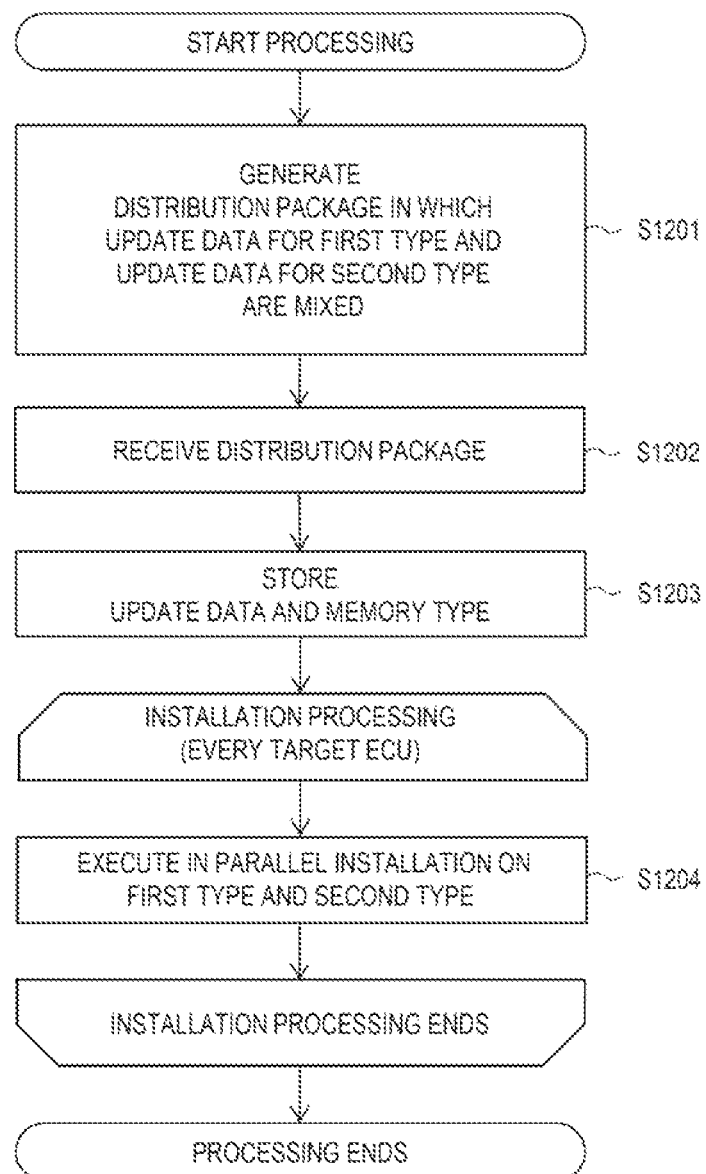
FIG. 12 is a flowchart of download/installation processing procedures according to a fifth specific example executed by the center, the OTA master, and the target electronic control unit.

FIG. 12 is a flowchart describing download and installation processing procedures according to a fifth specific example executed by the center 10, the OTA master 30, and the target ECU. The fifth specific example is an example where the distribution package including the update data for the target ECU having the first-type non-volatile memory (the single bank memory) mounted thereon and the update of the target ECU having the second-type non-volatile memory (the dual bank memory) mounted thereon is transmitted from the center 10. The type of the non-volatile memory mounted on each of the ECUs 40a to 40d is managed by the center 10. The processing illustrated in FIG. 12 is started when the center 10 receives the download request for the distribution package from the OTA master 30.

(Step S1201) The center 10 generates the distribution package including the update data for the ECU having the first-type non-volatile memory (the single bank memory) mounted thereon and the update data for the ECU having the second-type non-volatile memory (the dual bank memory) mounted thereon. At this time, the center refers to the type information stored in the storage unit 16 and generates the distribution package in which the update data for the first type and the update data for the second type are mixed. The memory type may be attached to the update data as the attribute. When the distribution package is generated, the process proceeds to step S1202.

(Step S1202) The OTA master 30 receives the distribution package transmitted from the center 10. When the distribution package is received, the process proceeds to step S1203.

(Step S1203) The OTA master 30 stores, in the storage unit 37, the update data included in the distribution package received from the center 10 and the memory type in the update data. When the update data and the memory type in the update data are stored, the process proceeds to step S1204.

(Step S1204) The OTA master 30 and the target ECU execute the installation, which is the processing for writing the update software on the storage area based on the update data. At this time, the installation on the target ECU having the first-type non-volatile memory mounted thereon and the installation on the target ECU having the second-type non-volatile memory mounted thereon are executed in parallel. When the execution of the installation on every target ECU is completed, this processing ends.

As in the fifth specific example, when the center 10 manages the type information, at the time of generating the distribution package, consistency between the update data and the target ECU for the memory type can be checked. For this reason, it is possible to avoid a situation where consistency is not found in the OTA master 30 after the download. Therefore, it is possible to prevent an occurrence of retransmitting the distribution package and restrict an increase in an amount of communication (the communication load) between the center 10 and the OTA master 30. Further, since the installation on the target ECU having the single bank memory mounted thereon and the installation on the target ECU having the dual bank memory mounted thereon can be executed in parallel, it is possible to complete, at an early stage, the software update processing of the system including the configurations of both the target ECU having the single bank memory mounted thereon and the target ECU having the dual bank memory mounted thereon.

Action and Advantageous Effect

As described above, with the network system according to the embodiment of the present disclosure, the center and the OTA master can transmit and receive with each other the distribution package including the update data for the ECU having the single bank memory (the first-type non-volatile memory) mounted thereon and the update data for the ECU having the dual bank memory (the second-type non-volatile memory) mounted thereon, that is, the distribution package in which a plurality of different types of pieces of update data is mixed.

As such, for example, in the case where the center manages the type information on the type of the non-volatile memory mounted on each of the ECUs mounted on the vehicle, at the time of generating the distribution package, consistency between the update data and the target ECU for the memory type can be checked. For this reason, it is possible to avoid a situation where consistency is not found in the OTA master after the download. Therefore, it is possible to prevent an occurrence of retransmitting the distribution package and restrict an increase in an amount of communication (the communication load) between the center and the OTA master. Further, in the case where the OTA master manages the type information, when the type of the non-volatile memory is changed due to replacement of the ECU or the like, the type information managed by the OTA master can be swiftly updated inside the vehicle (the in-vehicle network).

Further, since the OTA master can receive the distribution package including the update data for the ECU having the single bank memory mounted thereon and the update data for the ECU having the dual bank memory mounted thereon, the installation can be executed between the OTA master and the target ECU with prioritizing the target ECU having the dual bank memory that does not require the stop control during the update mounted thereon over the target ECU having the single bank memory that requires the stop control during the update mounted thereon.

As such, the OTA master can write the update software on the storage area of the target ECU having the dual bank memory mounted thereon first, and at the timing at which the writing is almost completed, start writing the update software on the storage area of the target ECU having the single bank memory mounted thereon. As such, it is possible to reduce the communication load inside the vehicle (the in-vehicle network) and shorten a time during which the control of the vehicle should be stopped until the writing of all the update software is completed.

Alternatively, the OTA master can also execute in parallel the installation on the target ECU having the single bank memory mounted thereon and the installation on the target ECU having the dual bank memory mounted thereon. In this case, it can be expected that the software update processing of a system including the configurations of both the target ECU having the single bank memory mounted thereon and the target ECU having the dual bank memory mounted thereon will be completed at an early stage.

As above, one embodiment of the present disclosure has been described, but the present disclosure can be regarded not only as the OTA master, but also as an update method executed by the OTA master including the processor and the memory, the update program, a computer readable non-transitory storage medium that stores the update program, the center communicable with the OTA master, the system including the center and the OTA master, the vehicle including the OTA master, or the like.

It is possible to use the technology of the present disclosure in a network system used for updating a program of an ECU.

What is claimed is:

1. An over-the-air (OTA) master, the OTA master being configured to control a software update for an electronic control unit mounted on a vehicle, the OTA master comprising:
    a communication unit configured to receive update data from a center; and
    a notification unit configured to notify the center of an error when a type indicated by the update data is different from a type of the electronic control unit in which the update data is to be installed.

2. A vehicle comprising:
    an OTA master according to claim 1.

3. The OTA master according to claim 1, wherein the update data includes first update data for an electronic control unit with a first type of non-volatile memory having one storage area and second update data for an electronic control unit with a second type of non-volatile memory having two storage areas.

4. The OTA master according to claim 3, further comprising:
    a control unit configured to, based on type information indicating whether a non-volatile memory mounted on an electronic control unit is the first type of non-volatile memory or the second type of non-volatile memory, transfer the first update data or the second update data received by the communication unit to the electronic control unit to be updated.

5. The OTA master according to claim 4, wherein the communication unit is configured to acquire the type information from the center.

6. The OTA master according to claim 4, further comprising:
    a storage unit configured to store the type information.

7. The OTA master according to claim 4, wherein
    the control unit is configured to transfer the update data to the electronic control unit to be updated with prioritizing, based on the type information, and
    the second update data for the electronic control unit on which the second type of non-volatile memory is mounted is transferred with priority over the first update data for the electronic control unit on which the first type of non-volatile memory is mounted.

8. The OTA master according to claim 1, further comprising a control unit configured to control activation of an electronic control unit on which a first type of non-volatile memory having one storage area is mounted and activation of an electronic control unit on which a second type of non-volatile memory having two storage areas is mounted to occur at different times.

9. The OTA master according to claim 1, wherein the type indicated by the update data indicates whether the electronic control unit to which the update data is installed is an electronic control unit on which a first type of non-volatile memory having one storage area is mounted or an electronic control unit on which a second type of non-volatile memory having two storage areas is mounted.

10. A center, the center being configured to communicate with an over-the-air (OTA) master that controls software update for an electronic control unit mounted on a vehicle, the center comprising:
    a transmission unit configured to transmit update data to the OTA master; and
    a receiving unit configured to receive a notification of an error from the OTA master when a type indicated by the update data is different from a type of the electronic control unit in which the update data is to be installed.

11. A system comprising:
    an OTA master configured to control software update for an electronic control unit mounted on a vehicle; and
    a center according to claim 10,
    wherein the OTA master includes a communication unit configured to receive the update data transmitted by the center.

12. The center according to claim 10, wherein the update data includes first update data for an electronic control unit with a first type of non-volatile memory having one storage area and second update data for an electronic control unit with a second type of non-volatile memory having two storage areas.

13. The center according to claim 12, further comprising:
    a storage unit configured to store type information indicating whether a non-volatile memory mounted on an electronic control unit is the first type of non-volatile memory or the second type of non-volatile memory.

14. The center according to claim 13, further comprising:
    a communication unit configured to transmit the type information stored in the storage unit to the OTA master.

15. The center according to claim 10, further comprising a control unit configured to control activation of an electronic control unit on which a first type of non-volatile memory having one storage area is mounted and activation of an electronic control unit on which a second type of non-volatile memory having two storage areas is mounted to occur at different times.

16. The center according to claim 10, wherein the type indicated by the update data indicates whether the electronic control unit to which the update data is installed is an electronic control unit on which a first type of non-volatile memory having one storage area is mounted or an electronic control unit on which a second type of non-volatile memory having two storage areas is mounted.

17. An update method executed by an over-the-air (OTA) master, the OTA master being configured to control software update for an electronic control unit mounted on a vehicle, the update method comprising:
    receiving, by the OTA master, update data from a center; and
    notifying the center of an error when a type indicated by the update data is different from a type of the electronic control unit in which the update data is to be installed.

18. A method executed by a center, the center being configured to communicate with an over-the-air (OTA) master that controls software update for an electronic control unit mounted on a vehicle, the method comprising:
 transmitting update data to the OTA master; and
 receiving a notification of an error from the OTA master when a type indicated by the update data is different from a type of the electronic control unit in which the update data is to be installed.

* * * * *